United States Patent
Li (10) Patent No.: US 12,047,001 B2
(45) Date of Patent: Jul. 23, 2024

(54) ZERO-CROSSING CORRECTION CIRCUIT AND ZERO-CROSSING CORRECTION METHOD FOR A SWITCHING CONVERTER

(71) Applicant: Silergy Semiconductor Technology (Hangzhou) LTD, Hangzhou (CN)

(72) Inventor: Guowang Li, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 243 days.

(21) Appl. No.: 17/750,650

(22) Filed: May 23, 2022

(65) Prior Publication Data

US 2022/0399812 A1 Dec. 15, 2022

(30) Foreign Application Priority Data

Jun. 11, 2021 (CN) .......................... 202110654669.2

(51) Int. Cl.
*H02M 3/156* (2006.01)
*H02M 1/38* (2007.01)
*H02M 3/157* (2006.01)
*H02M 3/158* (2006.01)

(52) U.S. Cl.
CPC ............. *H02M 3/158* (2013.01); *H02M 1/38* (2013.01); *H02M 3/157* (2013.01)

(58) Field of Classification Search
CPC ........ H02M 3/158; H02M 1/38; H02M 3/157; H02M 3/156
See application file for complete search history.

(56) References Cited

U.S. PATENT DOCUMENTS

| 7,777,461 B2 * | 8/2010 | Martin ................ H02M 3/1584 323/272 |
| 11,190,108 B2 * | 11/2021 | Zhang ............... H02M 3/33592 |
| 11,296,603 B2 * | 4/2022 | Luo ......................... H02M 1/08 |

OTHER PUBLICATIONS

The Chinese 1st Office Action for CN Application No. 202110654669.2; Issued on Jan. 6, 2022.

* cited by examiner

*Primary Examiner* — Adolf D Berhane

(57) ABSTRACT

A zero-crossing correction circuit for a switching converter having a main power switch and a synchronous power switch connected in series, can include: a detection circuit configured to detect an on-off state of a body diode of the synchronous power switch in a first time interval after the synchronous power switch is turned off and generate a detection signal; and a control and adjustment circuit configured to adjust a turn-off moment of the synchronous power switch according to an on-off state of the main power switch in a second time interval after the synchronous power switch is turned off and the detection signal.

20 Claims, 5 Drawing Sheets

ZERO-CROSSING CORRECTION CIRCUIT AND ZERO-CROSSING CORRECTION METHOD FOR A SWITCHING CONVERTER

RELATED APPLICATIONS

This application claims the benefit of Chinese Patent Application No. 2021106546692, filed on Jun. 11, 2021, which is incorporated herein by reference in its entirety.

FIELD OF THE INVENTION

The present invention generally relates to the field of power electronics, and more particularly, to zero-crossing correction circuits and methods for switching converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In a traditional non-synchronous buck converter, the rectifier transistor is typically a diode. After the inductor current crosses zero, the diode can be naturally cut off, and no additional logic judgment and processing may be required for the turn-off moment of the diode. In a synchronous buck converter, the rectifier transistor can be replaced by a metal-oxide-semiconductor field-effect transistor (MOSFET), and the current of the rectifier transistor may need to be detected. When the detected current drops to zero, the rectifier transistor can be controlled to be turned off. As the demand for the rated current of the chip becomes higher, the synchronous buck converter may have a smaller on-resistance than the non-synchronous buck converter, thus gaining market favor. As the on-resistance of the MOSFET in the synchronous buck converter is smaller, the logic judgment level of the zero-crossing point may need to be smaller, and the zero-crossing point deviation can become more common due to the design matching problem. In addition, if the dead time is too small, from discontinuous conduction mode (DCM) to continuous conduction mode (CCM) operation modes, the voltage drop of the rectifier transistor may not be detected, which can result in misjudgment of the zero-crossing point.

Figure 1:
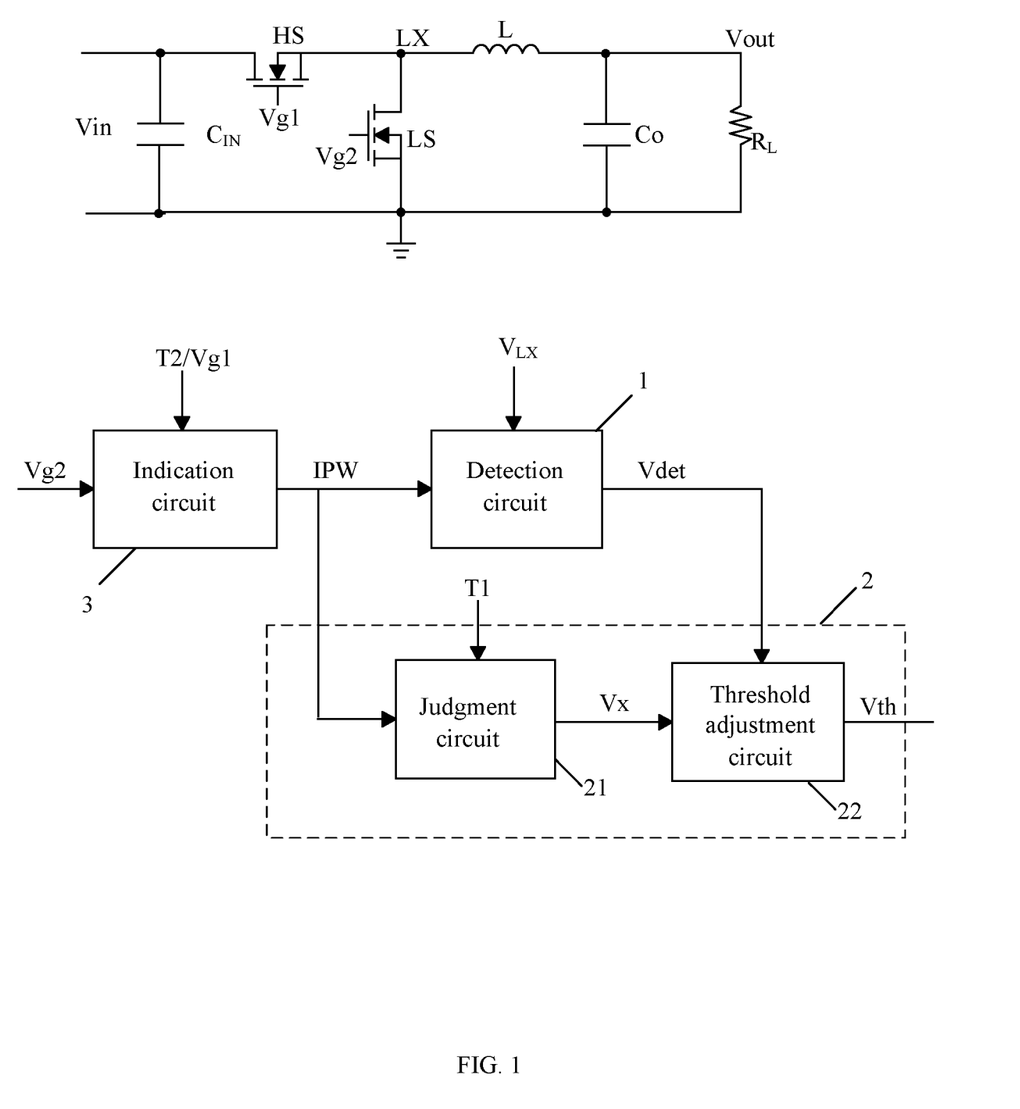
FIG. 1 is a schematic block diagram of an example zero-crossing correction circuit, in accordance with embodiments of the present invention.

Referring now to FIG. 1, shown is a schematic block diagram of an example zero-crossing correction circuit, in accordance with embodiments of the present invention. In this particular example, the switching converter is a buck converter. The buck converter can include main power switch HS and synchronous power switch LS connected in series between input voltage Vin and a reference ground, and the common point of the two power switches is LX. The buck converter can also include inductor L connected between common point LX and an output terminal of the converter, and output capacitor Co and load $R_L$ can connect in parallel between the output terminal and the reference ground to generate output voltage Vout. It should be understood that other converters with similar structures may also be applied in particular embodiments, such as synchronous boost, buck-boost, etc., which all may include a main power switch and a synchronous power switch connected in series, and an inductor connected to the common point of the main power switch and the synchronous power switch, where the synchronous power switch is to be turned off when the inductor current crosses zero.

The zero-crossing correction circuit can include detection circuit 1 and control and adjustment circuit 2. In this example, detection circuit 1 can detect the on-off state of the body diode of synchronous power switch LS in a first time interval after synchronous power switch LS is turned off and generate detection signal Vdet. Control and adjustment circuit 2 can adjust the turn-off moment of synchronous power switch LS according to the on-off state of main power switch HS and detection signal Vdet in a second time interval after synchronous power switch LS is turned off. For example, control and adjustment circuit 2 can adjust the turn-off moment of synchronous power switch LS according to detection signal Vdet when main power switch HS is not turned on in the second time interval after synchronous power switch LS is turned off. Control and adjustment circuit 2 can also maintain the turn-off moment of synchronous power switch LS to be the same as that in the previous switching period when main power switch HS is turned on in the second time interval. Here, the second time interval may start from the time when the synchronous power switch is turned off, and end after the synchronous power switch is turned off for preset second time T2, whereby second time T2 is greater than the dead time between main power switch HS and synchronous power switch LS.

It should be understood that when the converter may operate in the deep DCM mode, and both synchronous power switch LS and main power switch HS will be turned off for a relatively long time. Therefore, in the second time interval after synchronous power switch LS is turned off, main power switch HS may not be turned off. Thus in this mode, the turn-off point of the synchronous power switch can be adjusted to advance or delay according to whether the body diode of synchronous power switch LS is turned on after synchronous power switch LS is turned off. When the converter is switched from the DCM mode to the CCM mode, synchronous power switch LS and main power switch HS may both be turned off for a very short time.

Therefore, the body diode of synchronous power switch LS may not be completely turned on after synchronous power switch LS is turned off. If as determined by the on-off state of the body diode after synchronous power switch LS is turned off at this time, it can be considered that the turn-off point is lagging at this time, and the turn-off point of the synchronous power switch may need to be advanced, such that the circuit cannot enter the CCM mode normally. Therefore, when the turn-on signal of main power switch HS is detected in the second time interval after synchronous power switch LS is turned off, the adjustment of the turn-off point of synchronous power switch LS can be stopped to keep the turn-off point as that in the previous switching period. This can substantially avoid misadjustment of the turn-off point of synchronous power switch LS due to the dead time between main power switch HS and synchronous power switch LS being too short when entering the CCM mode from DCM mode.

The zero-crossing correction circuit can also include indication circuit 3 for generating indication signal IPW to indicate the time length of the first time interval; that is, the first time interval is an interval in which indication signal IPW is active. For example, indication signal IPW generated by indication circuit 3 can be controlled by driving signal Vg2 for controlling synchronous power switch LS, preset time T1, and driving signal Vg1 for controlling main power switch HS. In this example, indication signal IPW can become active (e.g., at a high level) when synchronous power switch LS is turned off (e.g., at the falling edge of driving signal Vg2). The moment that indication signal IPW becomes inactive (e.g., at a low level) can be determined by the earlier one of the moment that main power switch HS is turned on (e.g., the rising edge of drive signal Vg1) and the moment that the active duration of indication signal IPW reaches preset time T1. Preset time T1 is a preset value, which can be greater than second time T2 and less than the minimum turn-off time of main power switch HS.

In the deeper DCM mode, main power switch HS and synchronous power switch HS can be turned off for a relatively long time, so indication signal IPW can become inactive when the active duration reaches preset time T1. That is, the pulse width of indication signal IPW is a fixed value. When the converter operates in the critical continuous mode, since the dead time between main power switch HS and synchronous power switch LS is very short, indication signal IPW can become inactive at the moment when main power switch HS is turned on.

Accordingly, detection circuit 1 can detect the on-off state of the body diode of synchronous power switch LS during the period when indication signal IPW is active and generate detection signal Vdet. When it is detected that the body diode of synchronous power switch LS is in the conduction state during this period, detection signal Vdet generated by detection circuit 1 can be active (e.g., at a high level). When it is detected that the body diode of synchronous power switch LS is not conducting during this period, detection signal Vdet generated by detection circuit 1 can be inactive (e.g., at a low level). It should be understood that by setting the pulse width of indication signal IPW, sufficient detection time may be ensured, instead of detecting at the moment when the synchronous power switch is turned off, in order to avoid errors in the detection result.

There are many suitable ways to detect whether the body diode of synchronous power switch HS is in the conduction state. For example, voltage $V_{LX}$ at common point LX of main power switch HS and synchronous power switch LS can be detected to judge/determine whether the body diode of synchronous power switch HS is in the conduction state. When detection circuit 1 detects that the body diode of synchronous power switch LS is in the conduction state in the first time interval, this can indicate that the turn-off point is advanced (e.g., synchronous power switch LS is turned off before the inductor current drops to zero), and the inductor current is positive at this time and continues to freewheel through the body diode. At this time, voltage $V_{LX}$ can be a negative diode voltage drop (about −0.7V). When the body diode of synchronous power switch LS is in the off state, this may indicate that the turn-off point is lagging (e.g., synchronous power switch LS is turned off after the inductor current crosses zero), and the inductor current can be negative at this time and then flow through the body diode of main power switch HS. At this time, voltage $V_{LX}$ may be higher than input voltage Vin by a diode voltage drop (e.g., approximately Vin+0.7V).

In addition, control and adjustment circuit 2 can adjust zero-crossing threshold Vth according to indication signal IPW and detection signal Vdet, where zero-crossing threshold Vth can control the turn-off moment of synchronous power switch LS. For example, control and adjustment circuit 2 can include judgment circuit 21 and threshold adjustment circuit 22. Here, judgment circuit 21 can judge/determine whether zero-crossing threshold Vth needs to be adjusted according to indication signal IPW, and may generate adjustment signal Vx. For example, judgment circuit 21 can generate active judgment signal Vx at the end of the second time interval when the duration that indication signal IPW is active is greater than second time T2, and may generate inactive judgment signal Vx at the end of the second time interval when the duration that indication signal IPW is active is less than second time T2. It should be understood that any suitable circuitry for realizing this function can be utilized in certain embodiments.

In this example, threshold adjustment circuit 22 can adjust zero-crossing threshold Vth according to detection signal Vdet generated by detection circuit 1 when judgment signal Vx is active, and may maintain zero-crossing threshold Vth as that in the previous switching period when judgment signal Vx is inactive. In this example, when zero-crossing threshold Vth increases, the turn-off moment of synchronous power switch LS is delayed. Also, when zero-crossing threshold Vth decreases, the turn-off moment of synchronous power switch LS can be advanced.

Therefore, threshold adjustment circuit 22 may read the value of detection signal Vdet when judgment signal Vx is active. If detection signal Vdet is active, this can indicate that the body diode of synchronous power switch LS is in the conduction state at this time, so threshold adjustment circuit 22 can increase zero-crossing threshold Vth (e.g., e.g., by increasing by one step), which can delay the turn-off point.

When detection signal Vdet is inactive, this can indicate that the body diode of synchronous power switch LS is in the off state at this time, and thus threshold adjustment circuit 22 can decrease zero-crossing threshold Vth (e.g., decreasing by one step), such that the turn-off point is advanced. When judgment signal Vx is inactive, regardless of whether detection signal Vdet is active or inactive, threshold adjustment circuit 22 may not adjust zero-crossing threshold Vth, but can maintain zero-crossing threshold Vth unchanged as that in the previous switching period, such that even if the dead time is designed to be short, the actual turn-off point is still be correct.

It should be understood that judgment signal Vx can be generated at second time T2 later than the rising edge of indication signal IPW. That is, the action of controlling control and adjustment circuit 2 to adjust zero-crossing threshold Vth can be delayed by second time T2 from the turn-off moment of synchronous power switch LS, such that the zero-crossing detection and zero-crossing threshold adjustment are carried out separately, in order to avoid misjudgment.

Figure 2:
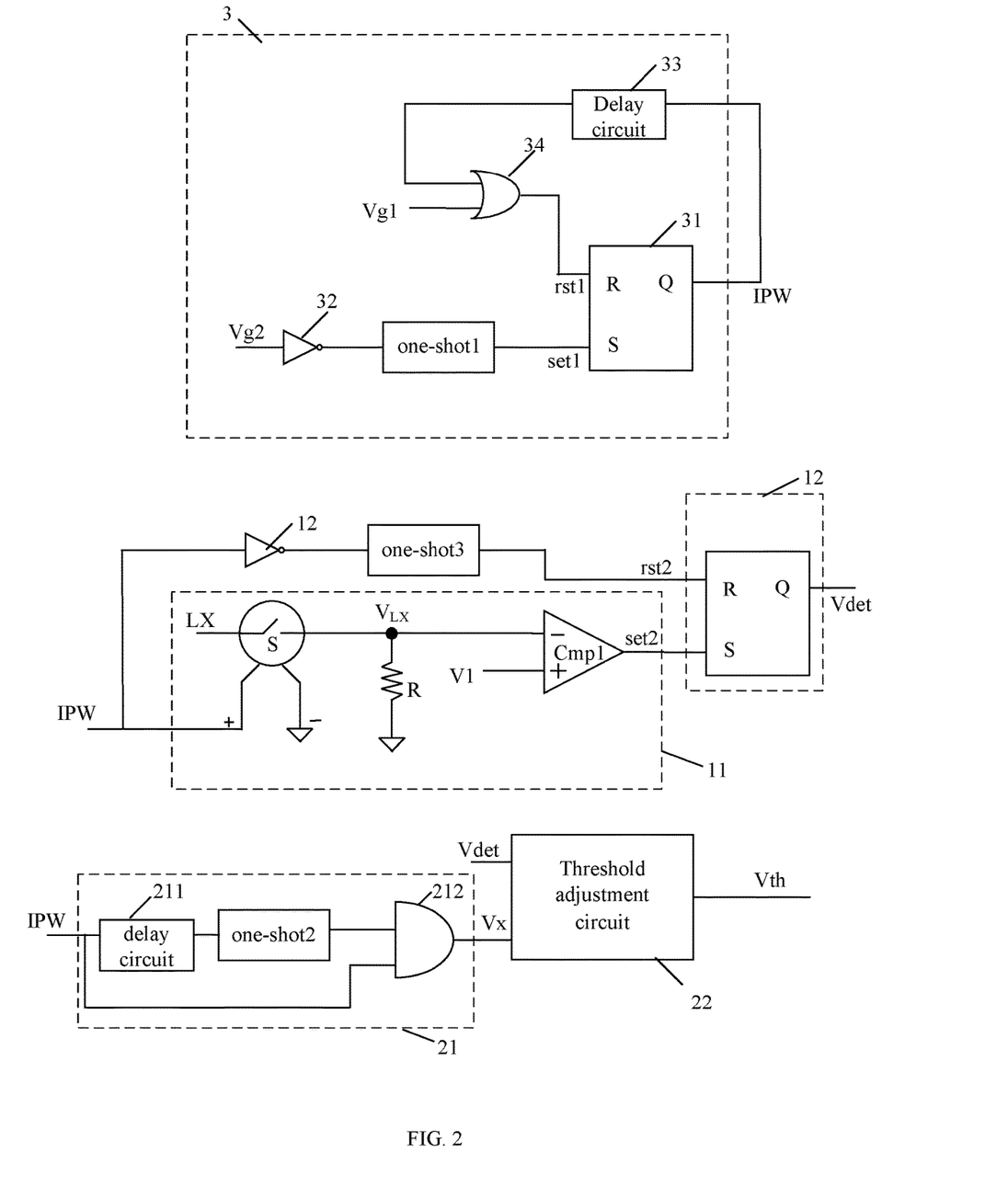
FIG. 2 is a schematic circuit diagram of an zero-crossing correction circuit, in accordance with embodiments of the present invention.

Referring now to FIG. 2, shown is a schematic circuit diagram of an zero-crossing correction circuit, in accordance with embodiments of the present invention. In this particular example, indication circuit 3 can include RS flip-flop 31. Set terminal S of RS flip-flop 31 can receive set signal set1, which may be generated when synchronous power switch LS is turned off, such that indication signal IPW generated at output terminal Q of RS flip-flop 31 is active. Reset terminal R of RS flip-flop 31 may receive reset signal rst1, which can be generated when main power switch HS is turned on (e.g., the rising edge of driving signal Vg1) or the active duration of indication signal IPW reaches preset time T1, such that indication signal IPW generated at output terminal Q of RS flip-flop 31 is inactive.

Indication circuit 3 can also include a set signal generating circuit for generating set signal set1, which can include inverter 32 and single-pulse trigger one-shot1. Driving signal Vg2 can be inverted by inverter 32 to generate an inverted signal and then may pass through single-pulse trigger one-shot1, such that set signal set1 can be generated at the rising edge of the inverted signal (e.g., the falling edge of driving signal Vg2, that is, when the synchronous power switch is turned off). Indication circuit 3 can also include a reset signal generating circuit to generate reset signal rst1, which can include delay circuit 33 and OR-gate circuit 34. Delay circuit 33 can delay indication signal IPW generated by RS flip-flop 31 for preset time T1, and OR-gate circuit 34 may receive driving signal Vg1 and the delayed indication signal IPW, in order to reset RS flip-flop 11 when the first active one of the two signals arrives.

Detection circuit 1 can include comparison circuit 11 and RS flip-flop 12. For example, comparison circuit 11 can compare voltage $V_{LX}$ at common node LX against threshold V1 during the period when indication signal IPW is active, and may generate set signal set2 according to the comparison result. In one example, threshold V1 is greater than the conduction voltage drop of the body diode (−0.7) and less than the maximum conduction voltage drop (e.g., equal to the product of peak value iLmax of the inductor current and on-resistance Rdson of the synchronous power switch, iLmax×Rdson). For example, threshold V1 is −0.3V. When voltage $V_{LX}$ is less than threshold V1 (e.g., it is indicated that the body diode is in the conduction state at this time), set signal set2 can be active and transmitted to set terminal S of RS flip-flop 12, such that detection signal Vdet generated at output terminal Q of RS flip-flop 12 is active. In addition, when indication signal IPW is inactive, reset signal rst2 can be generated and transmitted to reset terminal R of RS flip-flop 12, such that detection signal Vdet becomes inactive. It should be understood that, in order to avoid a negative value in the circuit, the sum of voltage $V_{LX}$ and a fixed value can also be compared against a second threshold (positive value), where the second threshold is the sum of threshold V1 and the fixed value. Of course, other implementations that can determine whether the body diode of synchronous power switch LS is turned on are also supported in certain embodiments.

Comparison circuit 11 can include comparator Cmp1, whereby a non-inverting input terminal of which may receive threshold V1, and an inverting input terminal of which may receive voltage $V_{LX}$. Also, comparison circuit 11 can include switch S controlled by indication signal IPW and resistor R. In this example, switch S can be controlled to be turned on when indication signal IPW is active, thereby effectively connecting common point LX to the inverting input terminal of comparator Cmp1. Resistor R can connect between the inverting input terminal of comparator Cmp1 and the reference ground, such that voltage $V_{LX}$ may be generated at the inverting input terminal of comparator Cmp1. Detection circuit 1 can also include a reset signal generating circuit to generate reset signal rst2, which can include inverter 12 and second single-pulse trigger one-shot3. Here, indication signal IPW can be inverted by inverter 12 to generate an inverted signal and then pass through second single-pulse trigger one-shot2, such that reset signal rst2 can be generated at the rising edge of the inverted signal (e.g., the falling edge of indication signal IPW).

Control and adjustment circuit 2 can include judgment circuit 21 and threshold adjustment circuit 22. For example, judgment circuit 21 can include delay circuit 211, single-pulse trigger one-shot2, and AND-gate circuit 212. Here, delay circuit 211 can delay indication signal IPW for time T2. Single-pulse trigger one-shot3 can generate pulse signal Vclk at the rising edge of the delayed indication signal. That is, pulse signal Vclk can be generated after the rising edge of indication signal IPW is delayed for time T2. AND-gate circuit 212 can receive pulse signal Vclk and indication signal IPW to generate judgment signal Vx, and when both pulse signal Vclk and indication signal IPW are active, judgment signal Vx can be active. When judgment signal Vx is active, this can indicate that threshold adjustment circuit 22 may adjust zero-crossing threshold Vth according to detection signal Vdet. When judgment signal Vx is inactive, this may indicate that threshold adjustment circuit 22 does not need to adjust zero-crossing threshold Vth. It should be understood that the adjustment of zero-crossing threshold Vth can be achieved through a digital circuit or an analog circuit in certain embodiments. In this example, voltage $V_{LX}$ can be directly compared with zero-crossing threshold Vth, and when voltage $V_{LX}$ is greater than zero-crossing threshold Vth, the turn-off signal of synchronous power switch LS can be generated. Of course, other suitable approaches can also be used for comparison to generate the turn-off signal of synchronous power switch LS.

Figure 3:
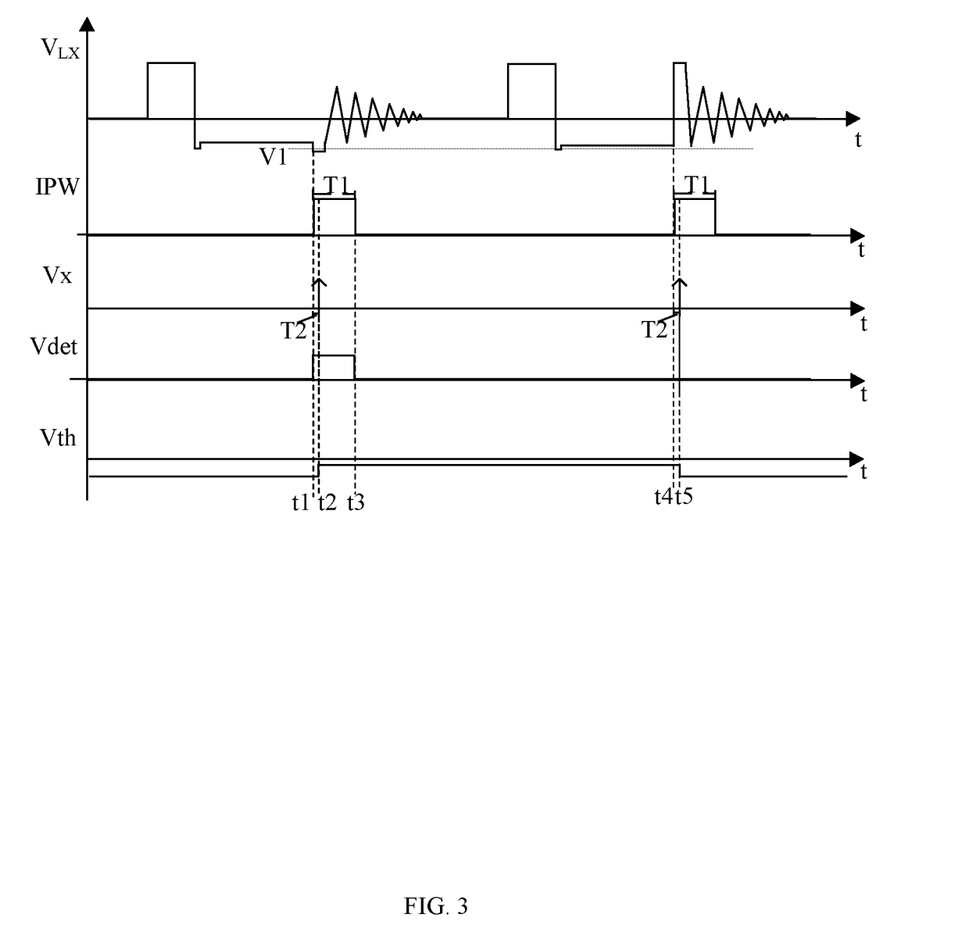
FIG. 3 is a waveform diagram of first example operation of the zero-crossing correction circuit, in accordance with embodiments of the present invention.

Referring now to FIG. 3, shown is a waveform diagram of first example operation of the zero-crossing correction circuit, in accordance with embodiments of the present invention. In this particular example, the waveform diagrams of voltage $V_{LX}$ at common node LX, indication signal IPW, judgment signal Vx, detection signal Vdet, and zero-crossing threshold Vth are respectively shown from top to bottom. For ease of description, the waveform diagram of voltage $V_{LX}$ is only for exemplary illustration, may ignore the voltage changes under different inductor currents.

Before time t1, synchronous power switch LS can be in the on state. At time t1, synchronous power switch LS may be turned off. At this time, indication signal IPW can be active. After that, detection circuit 1 may start to detect the on-off state of the body diode of synchronous power switch LS. Since it takes time to turn off synchronous power switch LS, a short time may elapse to allow for synchronous power switch LS to be completely turned off before detecting the on-off state of its body diode, in order to ensure the accuracy. It can be seen that voltage $V_{LX}$ suddenly drops after time t1 and is less than threshold V1, so detection signal Vdet is active. However, zero-crossing threshold Vth may not be directly adjusted at this time. After second time T2 (e.g., at time t2), indication signal IPW may remain inactive. That is, the active duration of indication signal IPW can exceed time T2, so the active judgment signal Vx generated at time t2 to indicate that zero crossing threshold Vth can be adjusted. Therefore, after time t2, since judgment signal Vx is active and detection signal Vdet is active, zero-crossing threshold Vth can be controlled to increase by one step and then maintained. After preset time T1 has elapsed from time t1, indication signal IPW may become inactive, and thus detection signal Vdet can becomes inactive, and waiting for the next switching period.

At time t4, synchronous power switch LS can be turned off. At this time, indication signal IPW may become active. After that, detection circuit 1 may begin to detect the on-off state of the body diode of synchronous power switch LS. It can be seen that voltage $V_{LX}$ suddenly rises to be greater than threshold V1 after time t4, so detection signal Vdet is inactive. However, at this time, zero-crossing threshold Vth may not be directly adjusted, but when second time T2 passes from time t4 to time t5, indication signal IPW may remain active. That is, the active duration of indication signal IPW can exceed time T2. Then at time t5, an active judgment signal Vx generated to indicate that zero-crossing threshold Vth can be adjusted. Therefore, after time t5, since judgment signal Vx may be active and detection signal Vdet inactive, and zero-crossing threshold Vth can be controlled to be decreased by one step and maintained. After preset time T1, indication signal IPW may become inactive, and thus detection signal Vdet may become inactive, waiting for the next switching period.

Figure 4:
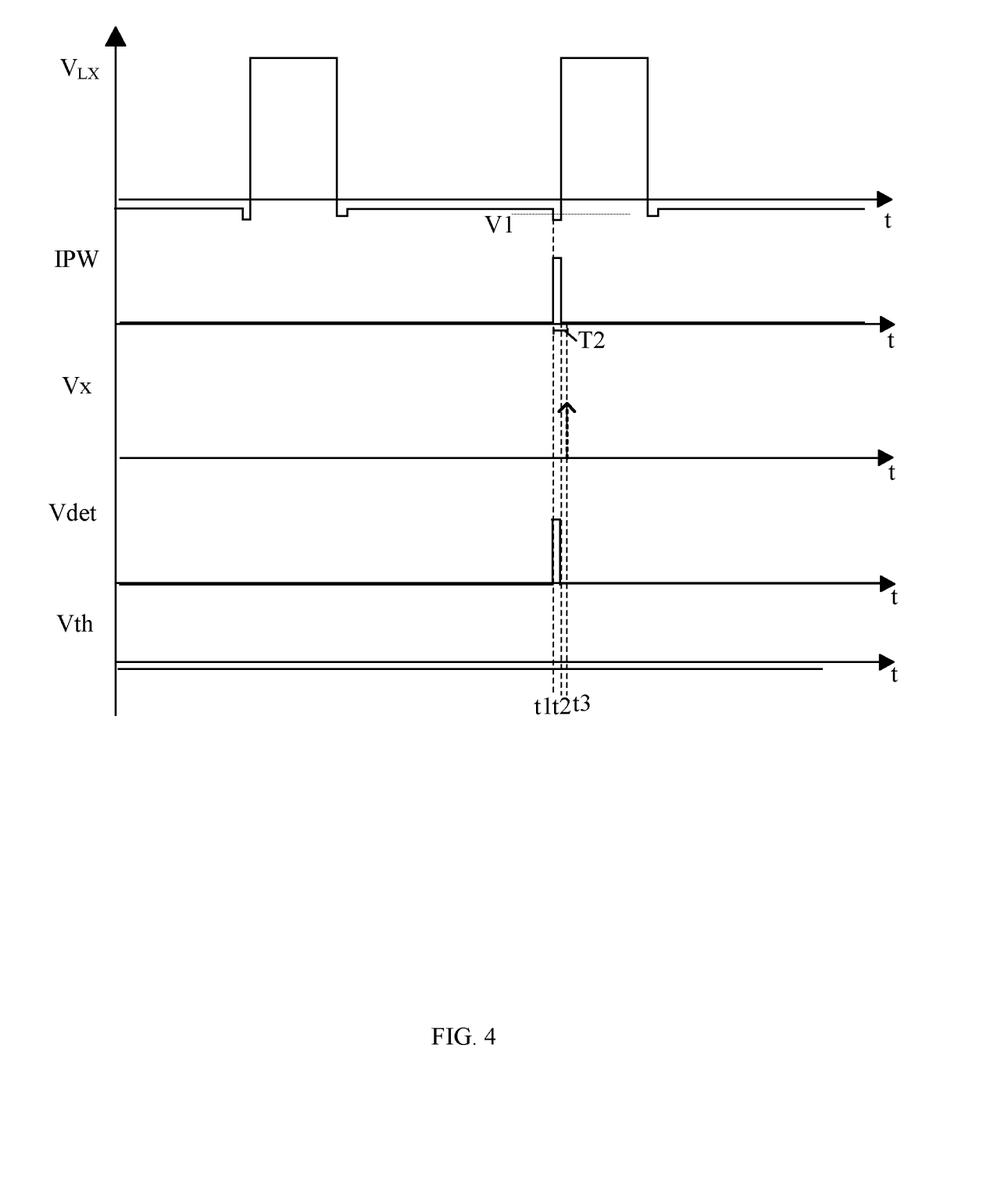
FIG. 4 is a waveform diagram of second example operation of the zero-crossing correction circuit, in accordance with embodiments of the present invention.

Referring now to FIG. 4, shown is a waveform diagram of second example operation of the zero-crossing correction circuit, in accordance with embodiments of the present invention. In this particular example, the waveform diagrams of voltage $V_{LX}$ at common node LX, indication signal IPW, judgment signal Vx, detection signal Vdet, and zero-crossing threshold Vth are respectively shown from top to bottom. For ease of description, the waveform diagram of voltage $V_{LX}$ is only for exemplary illustration, and may ignore the voltage changes under different inductor currents.

Before time t1, synchronous power switch LS can be in the on state. At time t1, synchronous power switch LS may be turned off, and voltage $V_{LX}$ drops suddenly, which can indicate that the inductor current continues to flow through the body diode of synchronous power switch LS, and voltage $V_{LX}$ is less than threshold V1. Thus, detection signal Vdet is active. However, zero-crossing threshold Vth may not be directly adjusted at this time. At time t2, main power switch HS can be turned on, such that voltage $V_{LX}$ suddenly increases to near input voltage Vin. Since time period t1-t2 is less than preset time T1, that is, when the turn-on moment of main power switch HS arrives, the active duration of indication signal IPW may have not reached preset time T1. Thus, indication signal IPW can be determined by the turn-on moment of main power switch HS, and may become inactive at time t2, such that detection signal Vdet is also inactive. After time T2 from time t1, it reaches time t3. At this time, since indication signal IPW has become inactive. That is, the active duration of indication signal IPW is less than second time T2, so judgment signal Vx generated at time t3 may be inactive (shown as a dashed line in FIG. 4), which can indicate that the threshold adjustment circuit does not need to adjust zero-crossing threshold Vth, and zero-crossing threshold Vth may remain unchanged.

Figure 5:
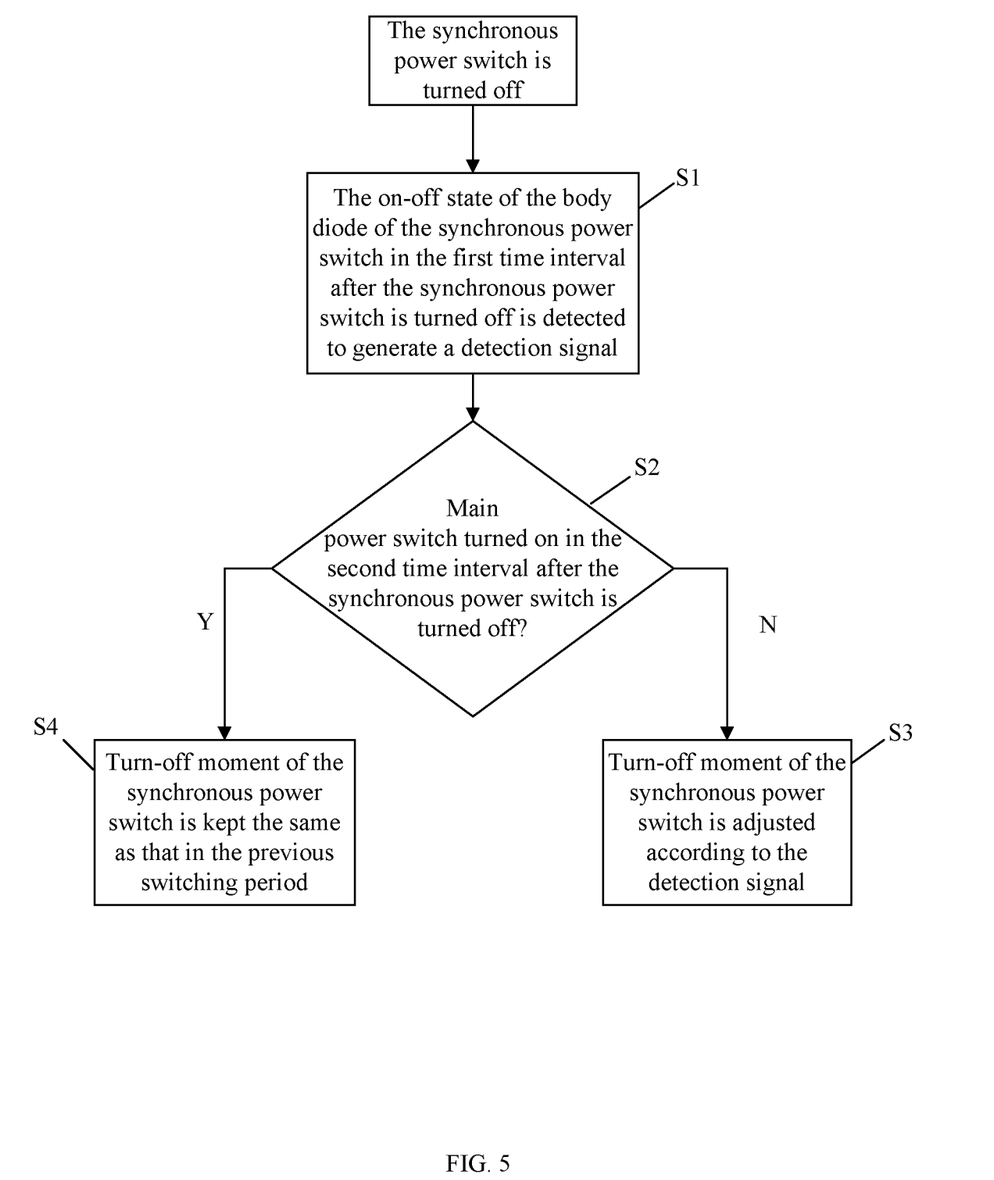
FIG. 5 is a flow chart of an example zero-crossing correction method, in accordance with embodiments of the present invention.

Referring now to FIG. 5, shown is a flow chart of an example zero-crossing correction method, in accordance with embodiments of the present invention. In this example, the zero-crossing correction method can include the following steps. At S1, the on-off state of the body diode of the synchronous power switch in the first time interval after the synchronous power switch is turned off can be detected to generate a detection signal. For example, the first time interval is an interval during which the indication signal is active, and the indication signal can become active when the synchronous power switch is turned off. The inactive moment of the indication signal can be determined by the earlier one of the moment that the main power switch is turned on and the moment that the active duration of the indication signal reaches the first time. At S2, whether the main power switch is turned on in the second time interval after the synchronous power switch is turned off can be determined. For example, the second time interval starts from the time when the synchronous power switch is turned off and ends after the synchronous power switch is turned off for a second time, and the second time is greater than the dead time between the main power switch and the synchronous power switch, and is less than the first time.

At S3, when the main power switch is not turned on in the second time interval after the synchronous power switch is turned off, the turn-off moment of the synchronous power switch can be adjusted according to the detection signal. For example, when the detection signal indicates that the body diode of the synchronous power switch is detected to be in the conduction state in the first time interval, the turn-off moment of the synchronous power switch is delayed. When the detection signal indicates that the body diode of the synchronous power switch is not in the conduction state in the first time interval, the turn-off moment of the synchronous power switch may be advanced. At S4, when the main power switch is turned on in the second time interval, the turn-off moment of the synchronous power switch can be maintained the same as that in the previous switching period.

In particular embodiments, a zero-crossing correction circuit may separately performs inductor current zero-crossing detection and zero-crossing turn-off point correction of the synchronous power switch. The turn-off point of the synchronous power switch can be adjusted to the level closest to zero after a plurality of switching periods, thereby avoiding the problem that the adjustment of the turn-off point of the synchronous power switch is out of control due to misdetection of the turn-off point when the dead time is relatively short.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A zero-crossing correction circuit for a switching converter having a main power switch and a synchronous power switch connected in series, the zero-crossing correction circuit comprising:
   a) a detection circuit configured to detect an on-off state of a body diode of the synchronous power switch in a first time interval after the synchronous power switch is turned off and generate a detection signal; and
   b) a control and adjustment circuit configured to adjust a turn-off moment of the synchronous power switch according to an on-off state of the main power switch in a second time interval after the synchronous power switch is turned off and the detection signal.

2. The zero-crossing correction circuit of claim 1, wherein:
   a) the control and adjustment circuit is configured to adjust the turn-off moment of the synchronous power switch according to the detection signal;
   b) when the main power switch is not turned on in the second time interval after the synchronous power switch is turned off; and
   c) the turn-on moment of the synchronous power switch is maintained as that in a previous switching period when the main power switch is turned on in the second time interval.

3. The zero-crossing correction circuit of claim 1, further comprising an indication circuit configured to generate an indication signal to indicate a time length of the first time interval, wherein the first time interval is an interval during which the indication signal is active.

4. The zero-crossing correction circuit of claim 3, wherein the indication signal becomes active when the synchronous power switch is turned off, and an inactive moment of the indication signal is determined by the earlier one of a moment that the main power switch is turned on and a moment that an active duration of the indication signal reaches a preset time.

5. The zero-crossing correction circuit of claim 4, wherein:
   a) the second time interval starts from a time when the synchronous power switch is turned off and ends after the synchronous power switch is turned off for a second time; and
   b) the second time is greater than a dead time between the main power switch and the synchronous power switch, and the second time is less than the preset time.

6. The zero-crossing correction circuit of claim 1, wherein:
   a) when the main power switch is not turned on in the second time interval after the synchronous power switch is turned off and the body diode of the synchronous power switch is detected to be in the conduction state in the first time interval, the turn-off moment of the synchronous power switch is delayed; and
   b) when the main power switch is not turned on in the second time interval after the synchronous power switch is turned off and the body diode of the synchronous power switch is not in the conduction state in the first time interval, the turn-off moment of the synchronous power switch is advanced.

7. The zero-crossing correction circuit of claim 4, wherein the control and adjustment circuit comprises:
   a) a judgment circuit configured to judge whether a zero-crossing threshold is adjusted according to the indication signal, and to generate a judgment signal; and
   b) a threshold adjustment circuit configured to adjust the zero-crossing threshold according to the indication signal to adjust the turn-off moment of the synchronous power switch when the judgment signal is active, and to maintain the zero-crossing threshold as that in a previous switching period when the judgment signal is inactive.

8. The zero-crossing correction circuit of claim 7, wherein the threshold adjustment circuit is configured to:
   a) increase the zero-crossing threshold when the judgment signal is active and the body diode of the synchronous power switch is detected to be in the conduction state in the first time interval, such that the turn-off moment of the synchronous power switch is delayed; and
   b) decrease the zero-crossing threshold when the judgment signal is active and the body diode of the synchronous power switch is not in the conduction state in the first time interval, such that the turn-off moment of the synchronous power switch is advanced.

9. The zero-crossing correction circuit of claim 7, wherein the judgment circuit is configured to:
   a) generate an active judgment signal at the end of the second time interval when active duration of the indication signal is greater than a second time; and
   b) generate an inactive judgment signal at the end of the second time interval when the active duration of the indication signal is less than the second time.

10. The zero-crossing correction circuit of claim 3, wherein the detection circuit is configured to judge the on-off state of the body diode of the synchronous power switch by comparing a voltage at a common node of the main power transistor and the synchronous power switch against a first threshold.

11. The zero-crossing correction circuit of claim 10, wherein the first threshold is greater than a conduction voltage drop of the body diode of the synchronous power switch and less than a maximum conduction voltage drop of the synchronous power switch.

12. The zero-crossing correction circuit of claim 3, wherein:
   a) the indication circuit comprises a first RS flip-flop, having a set terminal for receiving a first set signal, a reset terminal for receiving a first reset signal, and an output terminal for generating the indication signal;
   b) the first set signal is generated at the turn-off moment of the synchronous power switch; and
   c) the first reset signal is generated when the main power switch is turned on or the indication signal is inactive.

13. The zero-crossing correction circuit of claim 12, wherein the indication circuit further comprises:
   a) a first set signal generating circuit having a first inverter and a first single-pulse trigger, wherein a driving signal for the synchronous power switch is inverted by the first inverter to generate an inverted signal and then passes through the first single-pulse trigger, such that the first set signal is generated at a rising edge of the inverted signal; and
   b) a first reset signal generating circuit having a first delay circuit for delaying the indication signal by a preset time and an OR-gate circuit, wherein the OR-gate circuit receives the delayed indication signal and a driving signal for the main power switch to generate the first reset signal when the first active one of the two arrives.

14. The zero-crossing correction circuit of claim 10, wherein the detection circuit comprises:

a) a comparison circuit configured to compare the voltage at the common node with the first threshold when the indication signal is active, and to generate a second set signal; and
b) a second RS flip-flop, having a set terminal for receiving the second set signal, a reset terminal for receiving a second reset signal, and an output terminal for generating the detection signal, wherein the second reset signal is generated when the indication signal is inactive.

15. The zero-crossing correction circuit of claim 14, wherein the detection circuit further comprises a second reset generating circuit having a second inverter and a second single-pulse trigger, wherein the indication signal is inverted by the second inverter to generate an inverted signal and then passes through the second single-pulse trigger, in order to generate the second reset signal at a rising edge of the inverted signal of the indication signal.

16. The zero-crossing correction circuit of claim 7, wherein the judgment circuit comprises:
    a) a second delay circuit configured to delay the indication signal by a second time;
    b) a third single-pulse trigger configured to generate a pulse signal at a rising edge of the delayed indication signal; and
    c) an AND-gate circuit configured to receive the pulse signal and the indication signal to generate the judgment signal, wherein the judgment signal is active when both the pulse signal and the indication signal are active.

17. A method of zero-crossing correction for a switching converter having a main power switch and a synchronous power switch connected in series, the method comprising:
    a) delaying a turn-off moment of the synchronous power switch, when a body diode of the synchronous power switch is in a conduction state in a first time interval and when the main power switch is not turned on in a second time interval after the synchronous power switch is turned off;
    b) advancing the turn-off moment of the synchronous power switch, when the body diode of the synchronous power switch is not in the conduction state in the first time interval and when the main power switch is not turned on in the second time interval; and
    c) maintaining the turn-off moment of the synchronous power switch the same as that in a previous period when the main power switch is turned on in the second time interval.

18. The method of claim 17, wherein the first time interval starts from a moment when the synchronous power switch is turned off, and ends at a moment that is determined by the earlier one of a moment that the main power switch is turned on and a moment that a duration of the first time interval reaches a preset time.

19. The method of claim 18, wherein:
    a) the second time interval starts from a moment when the synchronous power switch is turned off and ends after a second time from the moment when the synchronous power switch is turned off; and
    b) the second time is greater than a dead time between the main power switch and the synchronous power switch, and the second time is less than the preset time.

20. The method of claim 19, further comprising:
    a) determining that the main power switch is not turned on in the second time interval after the synchronous power switch is turned off when the duration of the first time interval is greater than the second time; and
    b) determining that the main power switch is turned on in the second time interval after the synchronous power switch is turned off when the duration of the first time interval is less than the second time.

* * * * *